United States Patent Office 3,376,233
Patented Apr. 2, 1968

3,376,233
BENZO-BIS-TRIAZOLE POLYMERS
Walter George Gall, Wilmington, Del., assignor to E. I. du Pont de Nemours and Company, Wilmington, Del., a corporation of Delaware
No Drawing. Filed Jan. 4, 1965, Ser. No. 423,386
13 Claims. (Cl. 260—2)

ABSTRACT OF THE DISCLOSURE

A thermally stable polymeric material containing a substantial proportion of benzo-bis triazole units in the chain is prepared by a process in which an aryl bis-diazonium salt having from 1 to 3 aromatic rings is coupled with m-phenylene diamine in aqueous solution under substantially neutral conditions at from 0–50° C. and then oxidized with a complex of a divalent copper salt with an amine, including ammonia, at a temperature in the range between 50° C. and about 150° C.

---

This invention relates to new and useful plastic compositions and to a method of making the same.

The polymers of the present invention are made by the following process (a) An aryl bis-diazonium salt is coupled with m-phenylene diamine in aqueous solution under substantially neutral conditions.

The product of this reaction is a new linear polymer, which is formed according to the equation:

$$X^-N_2^+ArN_2^+X^- + H_2N\text{-}\langle\rangle\text{-}NH_2 \longrightarrow \left[\text{-Ar-N=N-}\langle\rangle\text{-N=N-}\atop H_2N\text{-}\langle\rangle\text{-}NH_2\right]_n$$

In the above formulae Ar is a bivalent aromatic radical, and $X^-$ is an anion, preferably $Cl^-$.

The coupling reaction can be performed at temperatures in the range of 0–50° C. and preferably from 0–15° C.

(b) Oxidizing the product obtained by step (a) with a complex of a divalent copper salt with an amine, including ammonia, preferably at a temperature in the range between 50° C. and about 150° C.

The product of this oxidation is a thermally stable polymeric plastic characterized by the presence of a substantial proportion of benzo-bis-triazole units in the chain, which can be represented by the formula:

$$\left[\text{-Ar-N}\langle\!\langle\rangle\!\rangle\text{N-}\right]$$

During the coupling process, some nitrogen is lost. Thus, a portion of the units in the molecular chain have the formula:

$$\left[\text{-Ar-N}\langle\rangle\text{-NY}_2\right]$$

wherein $Y_2$ is $H_2$ or $O_2$; i.e., the units are in general either nitro or amino groups in varying proportions depending on the extent of the oxidation.

Accordingly, the benztriazole polymers of the invention can be described as the oxidation product of $$\text{-Ar-N=N-}\langle\rangle\text{-N=N-}\atop H_2N\text{-}\langle\rangle\text{-}NH_2$$

which consists essentially of units selected from $$\text{-Ar-N}\langle\!\langle\rangle\!\rangle\text{N-}$$

and $$\text{-Ar-N}\langle\rangle\text{-NY}_2$$

wherein Ar is a bivalent aromatic radical and $Y_2$ is selected from $H_2$ and $O_2$.

In the above formulae the aromatic bivalent radical Ar having from 1 to 3 aromatic rings which can be isolated or fused, and including heterocyclic rings. The preferred Ar groups are those containing 1 to 2 benzenoid rings which can be represented by the formulae:

and in which R can be carbon in an alkylene or perfluoroalkylene chain having from 1–3 carbon atoms, oxygen, silicon containing groups such as $$-\underset{R_3}{\overset{R_2}{\underset{|}{Si}}}- \text{ and } -O-\underset{R_3}{\overset{R_2}{\underset{|}{Si}}}-O-$$

phosphorus containing groups such as $$-\underset{O}{\overset{R_2}{\underset{\|}{P}}}- \text{ and } -O-\underset{O}{\overset{R_2}{\underset{\|}{P}}}-O-$$

$NR_4$ and sulphur alone or with oxygen i.e. as $-S-$ or $-SO_2-$. In the formulae $R_2$, $R_3$ and $R_4$ are alkyl groups having from 1–4 carbon atoms and in addition $R_4$ can be hydrogen.

More preferably Ar is or

The polymeric products thus obtained are brown powders which decompose before melting. They can be fabricated by compression molding at temperatures in the range of 400–450° C. and at pressures of about 5000–50,000 p.s.i. to form tough articles which have extraordinary temperature resistance. The extreme temperature resistance of their materials is surprising in view of the high nitrogen content of the molecular structure.

The bis-triazole structures are evidently conjugated aromatic structures, but cannot be adequately represented by conventional formulae employing alternating single and double bonds. Accordingly, the aromatic character of the rings is indicated by a circle within the rings.

The bis-diazonium salts which are employed to form a linear azo polymer in step (a) of the above process may be made by conventional techniques i.e. the corresponding aromatic diamines are dissolved in a mineral acid such as hydrochloric acid, the solution cooled to between about 0° and 5° C. in ice bath, and an aqueous solution of sodium nitrite is slowly added until diazotization is complete.

The coupling reaction of step (a) to form an azo polymer is performed by adding the m-phenylene diamine and thereafter a buffering agent such as an excess of sodium acetate to the diazonium salt, to produce a solution having a pH preferably in the range between pH 8 and pH 4. The temperature of the mixture is preferably maintained in the range between about 10° C. and 30° C. although this temperature is not highly critical.

With regard to the copper complex employed to oxidize the azo polymers produced by step (a), any cupriammonium complex, i.e., cupric ions complexed with ammonia or relatively low molecular weight amine (i.e., preferably having less than 10 carbon atoms attached to nitrogen) can be employed. Examples of such amines are methylamine, ethylamine, n-butylamine, isobutylamine, dimethylamine, diethylamine, trimethylamine, tri-n-propylamine, pyridine, which is preferred and the like.

The oxidation reaction step (b) is preferably conducted in the presence of an inert liquid. The temperature can be regulated by suitable selection of the diluent, and conducting the oxidation under reflux condition. The preferred diluents are tertiary amines such as pyridine which form complexes with divalent copper salts. The oxidation is complete when no further change in the N—H absorption band in the 3μ region can be detected.

In addition to complexes of copper with amines or ammonia it is also contemplated to employ other mild oxidizing agents in the process of this invention.

Many other modifications of the polymeric products and the process of making the same will occur to those skilled in the art, for example mixed aryl bis-diazonium salts may be employed to produce copolymers, terpolymers and the like.

The products of the present invention are powders which are generally brown to black in color and which can be fabricated into massive shapes by heat and pressure. The products may be fabricated alone, mixed with other similar materials, or with inert fillers such as metal powders, metal oxides, minerals, synthetic inorganic materials, glasses or the like. Useful articles may be fabricated directly by such techniques, or rod, bar or sheet stock may be fabricated, then machined to the desired article by metal working techniques such as turning, milling, drilling, tapping, sawing, stamping, swaging or the like.

The invention is further illustrated by the following specific examples, which are not, however, intended to fully delineate the scope of this invention.

Example 1

A stirred suspension of 20.02 gms. of 4,4'-diaminodiphenyl ether in 43.1 ml. of hydrochloric acid and 100 ml. of water was cooled to 0° C. by direct addition of ice along with external cooling in an ice bath. A solution of 14.50 gms. of 97% sodium nitrite in 20 ml. of cold water was then added dropwise, keeping the temperature below 5° C. during the addition and for 30 minutes thereafter. Then 10.82 gms. of purified m-phenylenediamine was added followed by a solution of 40.8 gms. of crystalline sodium acetate in 100 ml. of water, the temperature being maintained at 12-18° C. during the addition and for 30 minutes thereafter. The product of the reaction was a brown-black polymeric precipitate having the principal unit structure:

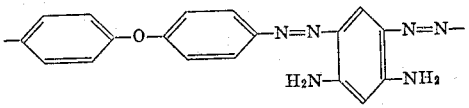

The product was separated by filtration, washed with water, then washed with acetone and dried in vacuum at 70° C. Yield 33 gms. (100%). The polymer dissolved in sulfuric acid to give a deep purple colored solution, inherent viscosity at 0.5% by weight concentration, 0.14.

A stirred refluxing suspension of the polymeric azo compound, 16.5 gms., in 150 mls. of pyridine was treated with a hot solution of 75 gms. of crystalline copper sulphate in 150 mls. of water and 150 mls. of pyridine. Heating at reflux was continued for 2.5 hours, and the product was then separated by filtration and washed successively with hot pyridine, hot water and hot acetone. The product was dried at 70° C., and heated overnight at 275° C. under nitrogen. The product, by elemental analysis, infrared spectroscopy and the mode of formation consisted of about 50% of repeat units having the formula:

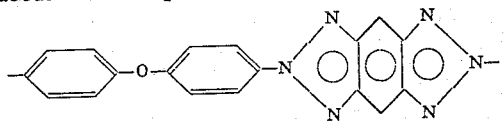

and the remainder

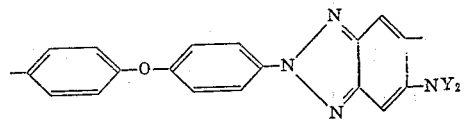

in which $Y_2$ is $O_2$ or $H_2$ in about roughly equal amounts.

A chip of the polymer 1.25 inches in diameter and about 80 mils thick is placed on a circular support having an 11/16" slot diametrically across its face. The sample is loaded with a chisel-shaped tool opposite the slot, having a width slightly greater than the disc, and an edge having a radium of 1/32". The bar is driven by an air-operated piston consisting of a 4" diameter Meade air clamp. The air pressure needed to break the chip is found and the thickness of the chip is measured by micrometer. The strength factor is then calculated from the following relationship $$\text{Strength Factor} = \frac{\text{p.s.i to break}}{(\text{thickness in mils})}$$

2.3 gms. of the polymer made as described above was molded into a chip 1¼ inches in diameter by compression molding in a 20 ton press at 10,000 p.s.i. and 425° C., the heat and pressure being applied for about 10 minutes. The chip was black and glossy. The strength factor measured as described above was 0.22. The strength factor has been correlated with tensile strength for other polymers, a strength factor of 0.22 coresponding to a tensile strength of about 8000–10,000 p.s.i.

The thermal stability was determined using a calibrated spring balance having a pan containing a small sample of the polymer suspended in a furnace. The system was maintained under nitrogen. At 450° C., an unstable fraction of 2.77% was rapidly evaporated, the remainder of the polymer degrading at a rate of only $5.5 \times 10^{-4}$ min.$^{-1}$.

Example II

A stirred suspension of 10.00 g. of p,p'-diaminodiphenyl methane in 21.55 ml. of hydrochloric acid and 50 ml. of water was cooled to 0° C. and treated with a solution of 7.25 g. of 97% sodium nitrite in 10 ml. of cold water, keeping the temperature below 5° during the addition and for 15 minutes thereafter. Then 5.41 g. of m-phenylene-diamine was added, followed by a solution of 20.4 g. of crystalline sodium acetate in 50 ml. of water, keeping the temperature at 10–15° C. during the addition and for 30 minutes thereafter. The product was then separated by hot filtration and was washed with water and acetone before vacuum drying overnight at 70°. The yield of brown solid obtained was 16.5 g.

A stirred refluxing suspension of 9.85 g. of this polymeric azo compound in 100 ml. of pyridine was treated with a hot solution of 45 g. of crystalline copper sulfate in 100 ml. of water and 100 ml. of pyridine. Heating under reflux was continued for 2½ hours and the product was then isolated by filtration of the hot suspension. After washing with hot pyridine, water and acetone the red-brown product was dried overnight at 70° in a vacuum oven and then heated at 275° C. for 16 hours under a nitrogen atmosphere, yielding 6.5 g. of light brown powder. Elemental analysis yielded 72.66% C., 4.43% H and 17.87% N. This polymer consisted largely of units of:

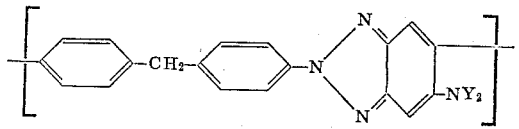

together with units of:

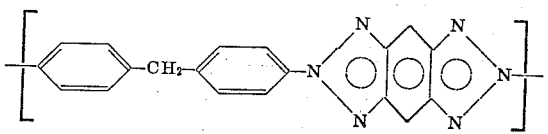

in which $Y_2$ is $O_2$ or $H_2$ in roughly comparable amounts.

A chip, molded as described previously but at 400°, was black and had a strength factor of 0.21, corresponding to a tensile strength of approximately 7500–9500 p.s.i.

Example III

A stirred solution of 10.82 g. of m-phenylene-diamine in 43.1 ml. of hydrochloric acid and 100 ml. of water was cooled to 0° and treated with a solution of 14.50 g. of 97% sodium nitrite in 20 ml. of water, keeping the temperature at 0–5° during the addition and for 30 minutes thereafter. Then 10.82 g. of m-phenylenediamine was added, followed by a solution of 40.8 g. of crystalline sodium acetate in 100 ml. of water, keeping the temperature at 10–15° during the addition and for thirty minutes thereafter. The product was then separated by hot filtration, washed with water and acetone and vacuum dried at 70°. The yield of black solid was 22.5 g. (95%).

A stirred refluxing suspension of 11.9 g. of this polymeric azo compound in 150 ml. of pyridine was treated with a hot solution of 75 g. of crystalline copper sulfate in 150 ml. of water and 150 ml. of pyridine. Heating under reflux was continued for 2½ hours and the product was then isolated by filtration of the hot suspension. After washing with hot pyridine, water and acetone, the brown product was dried at 70° in a vacuum oven and then heated at 275° for 4½ hours under a nitrogen atmosphere, yielding 6.0 g. of brown powder.

This product contained the following units in its polymeric structure:

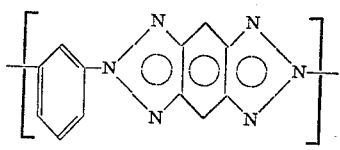

together with units of:

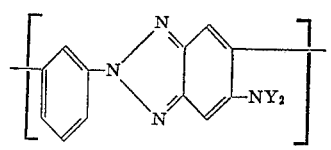

in which $Y_2$ is $O_2$ or $H_2$.

A chip, molded as described previously but at 435° C., was jet black in color and had a strength factor of 0.08, corresponding to a tensile strength of approximately 1000 p.s.i.

What is claimed is:
1. A process for the manufacture of thermally stable plastics which comprises:
    (a) coupling an aryl bis-diazonium salt having from 1 to 3 aromatic benzenoid rings which can be isolated or fused with m-phenylenediamine in aqueous solution under substantially neutral conditions, and
    (b) contacting the polymeric product obtained in (a) with a complex of a divalent copper salt with an amine; and
    (c) recovering a polymeric product substantially free of azo groups.
2. Process of claim 1 in which the said cupric salt is complexed with pyridine.
3. A thermally stable polymer containing benztriazole structures obtained by the oxidation of

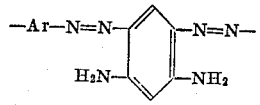

and consisting essentially of chain units selected from

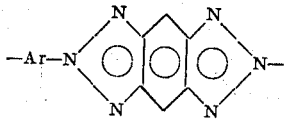

and

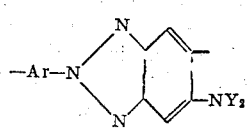

in which Ar is a bivalent aromatic radical having from 1 to 3 aromatic benzenoid rings which can be isolated or fused and $Y_2$ is selected from $H_2$ or $O_2$.

4. The composition of claim 3 in which Ar is

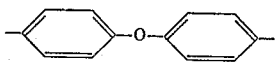

5. The composition of claim 3 in which Ar is

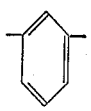

6. The composition of claim 3 in which Ar is

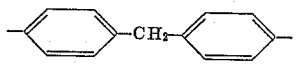

7. As an intermediate for the manufacture of thermally stable polymers, a polymeric compound consisting essentially of repeating units having the formula:

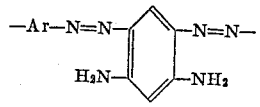

in which Ar is a bivalent aromatic radical having from 1 to 3 aromatic benzenoid rings which can be isolated or fused.

8. Compound of claim 7 in which Ar is

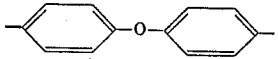

9. Compound of claim 7 in which Ar is

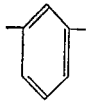

10. Compound of claim 7 in which Ar is

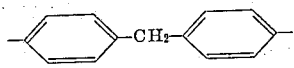

11. The process of claim 1 in which the aryl portion of the aryl bis-diazonium salt of step (a) is selected from the group consisting of

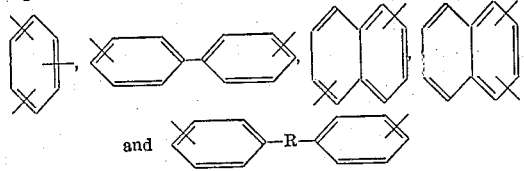

and 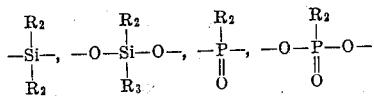

in which R can be carbon in an alkylene or perfluoroalkylene chain having from 1–3 carbon atoms, oxygen $$-\underset{R_2}{\overset{R_2}{Si}}-, \quad -O-\underset{R_3}{\overset{R_2}{Si}}-O-, \quad -\underset{O}{\overset{R_2}{P}}-, \quad -O-\underset{O}{\overset{R_2}{P}}-O-$$

$NR_4$, $-S-$ and $-SO_2-$ in which $R_2$, $R_3$ and $R_4$ are alkyl groups having from 1–4 carbon atoms and in addition $R_4$ can be hydrogen.

12. The composition of claim 3 in which Ar is a bivalent aromatic radical selected from the group consisting of

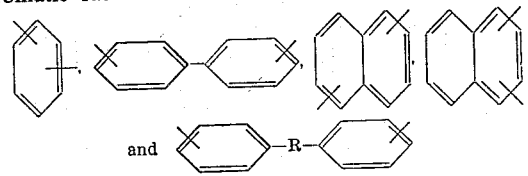

and 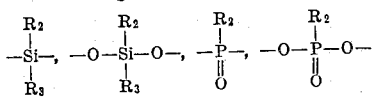

in which R can be carbon in an alkylene or perfluoroalkylene chain having from 1–3 carbon atoms, oxygen $$-\underset{R_3}{\overset{R_2}{Si}}-, \quad -O-\underset{R_3}{\overset{R_2}{Si}}-O, \quad -\underset{O}{\overset{R_2}{P}}-, \quad -O-\underset{O}{\overset{R_2}{P}}-O-$$

$NR_4$, $-S-$ and $-SO_2-$ in which $R_2$, $R_3$ and $R_4$ are alkyl groups having from 1–4 carbon atoms and in addition $R_4$ can be hydrogen.

13. The compound of claim 7 in which Ar is a bivalent aromatic radical selected from the group consisting of

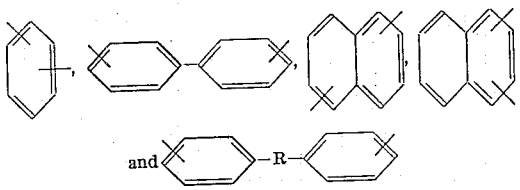

and 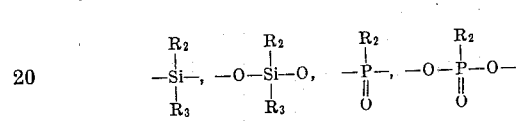

in which R can be carbon in an alkylene or perfluoroalkylene chain having from 1–3 carbon atoms, oxygen $$-\underset{R_3}{\overset{R_2}{Si}}-, \quad -O-\underset{R_3}{\overset{R_2}{Si}}-O, \quad -\underset{O}{\overset{R_2}{P}}-, \quad -O-\underset{O}{\overset{R_2}{P}}-O-$$

$NR_4$, $-S-$ and $-SO_2-$ in which $R_2$, $R_3$ and $R_4$ are alkyl groups having from 1–4 carbon atoms and in addition $R_4$ can be hydrogen.

References Cited

FOREIGN PATENTS 907,105 10/1962 Great Britain.
142,426 3/1961 U.S.S.R.

OTHER REFERENCES

Kotlyarevskii et al., "Izvestia Akad. Nauk USSR," October 1964, pp. 1854–1860 (62 Chemical Abstracts 6571).

SAMUEL H. BLECH, *Primary Examiner.*